(12) United States Patent
Kim et al.

(10) Patent No.: US 10,479,214 B2
(45) Date of Patent: Nov. 19, 2019

(54) METHOD AND SYSTEM FOR CONTROLLING AIR FLOW SUPPLIED TO VEHICLE FUEL CELL

(71) Applicants: Hyundai Motor Company, Seoul (KR); Kia Motors Corporation, Seoul (KR)

(72) Inventors: Dae Jong Kim, Gyeonggi-do (KR); Jae Hoon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 177 days.

(21) Appl. No.: 15/214,638

(22) Filed: Jul. 20, 2016

(65) Prior Publication Data

US 2017/0297451 A1     Oct. 19, 2017

(30) Foreign Application Priority Data

Apr. 18, 2016  (KR) ........................ 10-2016-0046918

(51) Int. Cl.

| | | |
|---|---|---|
| *H01M 8/04* | (2016.01) | |
| *B60L 1/00* | (2006.01) | |
| *B60L 11/18* | (2006.01) | |
| *H01M 8/04119* | (2016.01) | |
| *H01M 8/04537* | (2016.01) | |

(Continued)

(52) U.S. Cl.
CPC ........... *B60L 11/1898* (2013.01); *B60L 1/003* (2013.01); *B60L 50/72* (2019.02); *B60L 58/12* (2019.02); *B60L 58/40* (2019.02); *H01M 8/04* (2013.01); *H01M 8/04126* (2013.01); *H01M 8/04395* (2013.01); *H01M 8/04552* (2013.01); *H01M 8/04589* (2013.01); *H01M 8/04649* (2013.01); *H01M 8/04753* (2013.01); *H01M 8/04828* (2013.01); *H01M 2250/20* (2013.01); *Y02T 10/705* (2013.01); *Y02T 10/7044* (2013.01);

(Continued)

(58) Field of Classification Search
CPC ......... H01M 8/04126; H01M 8/04552; H01M 8/04828; H01M 8/04395; H01M 8/04589; H01M 8/04649; H01M 8/04753; H01M 2250/20; B60L 11/1898; B60L 50/72; B60L 58/12; B60L 58/40; B60L 1/003
See application file for complete search history.

(56) References Cited

U.S. PATENT DOCUMENTS

| | | | | |
|---|---|---|---|---|
| 7,695,839 B2 * | 4/2010 | Arthur | .............. | H01M 8/04104 429/431 |
| 2006/0234094 A1* | 10/2006 | Sakai | .................. | B60L 11/1885 429/429 |

(Continued)

FOREIGN PATENT DOCUMENTS

| | | | | |
|---|---|---|---|---|
| JP | 63045763 A | * | 2/1988 | ........ H01M 8/04589 |
| JP | 2011-008990 A | | 1/2011 | |

(Continued)

*Primary Examiner* — Gregg Cantelmo
(74) *Attorney, Agent, or Firm* — Mintz Levin Cohn Ferris Glovsky and Popeo, P.C.; Peter F. Corless

(57) ABSTRACT

A method and system for controlling air flow is arranged to reduce power consumption of an air blower or an air compressor by controlling air flow, enhance stack performance by preventing stack dry-out that is more likely to occur in a low-flow range, and improve durability of the stack by decreasing frequency of exposure to high voltages.

4 Claims, 7 Drawing Sheets

(51) Int. Cl.
   *H01M 8/04828*    (2016.01)
   *H01M 8/0438*     (2016.01)
   *H01M 8/04746*    (2016.01)
   *B60L 58/12*      (2019.01)
   *B60L 50/72*      (2019.01)
   *B60L 58/40*      (2019.01)

(52) U.S. Cl.
   CPC ................ *Y02T 10/92* (2013.01); *Y02T 90/32* (2013.01); *Y02T 90/34* (2013.01)

(56) References Cited

U.S. PATENT DOCUMENTS

| | | | | |
|---|---|---|---|---|
| 2007/0141417 | A1* | 6/2007 | Bitoh | C01B 3/323 429/423 |
| 2008/0176111 | A1* | 7/2008 | Schaffnit | H01M 8/04089 429/431 |
| 2009/0035630 | A1* | 2/2009 | Kumada | H01M 8/04238 429/430 |
| 2009/0208789 | A1* | 8/2009 | Janarthanam | B60L 11/1892 429/445 |
| 2010/0047630 | A1* | 2/2010 | Imanishi | H01M 8/04268 429/437 |

FOREIGN PATENT DOCUMENTS

| | | |
|---|---|---|
| KR | 10-2012-0051791 A | 5/2012 |
| KR | 10-1272511 B1 | 6/2013 |
| KR | 10-2014-0037724 A | 3/2014 |
| KR | 2014-0037724 A | 3/2014 |
| KR | 10-1491303 B1 | 2/2015 |
| KR | 10-1567643 B1 | 11/2015 |
| KR | 10-1567644 B1 | 11/2015 |

* cited by examiner

METHOD AND SYSTEM FOR CONTROLLING AIR FLOW SUPPLIED TO VEHICLE FUEL CELL

CROSS-REFERENCE TO RELATED APPLICATION

This application claims under 35 U.S.C. § 119(a) the benefit of Korean Patent Application No. 10-2016-0046918, filed on Apr. 18, 2016, the entire contents of which are incorporated by reference herein.

BACKGROUND (a) Field of the Invention

The present invention relates to a method and system for efficiently controlling an air flow supplied to a vehicle fuel cell.

(b) Description of the Related Art

In operation of a fuel cell system, air flow is a major factor that affects the performance of a stack and the efficiency of the system.

The main purpose of air supply control is to minimize air supply while maintaining optimal stack performance. Air supply quantity is determined by a current quantity and a stoichiometric ratio, which can be determined by an air flow controller. The air flow controller can supply a minimum air flow to a fuel cell in order to maintain cell voltage uniformity in states other than a stop state.

A minimum air flow can be supplied to the fuel cell according to current in the range of 30 to 50 A, and thus flooding in the fuel cell can be prevented and voltage uniformity can be obtained.

However, when supply of current in the range of 30 to 50 A to the fuel cell is maintained for a long time in order to supply a minimum air flow, air exceeding a necessary air flow is supplied to the fuel cell, resulting in air supply time increase.

When air supply time increases, the inside of the fuel cell stack is dried, causing an air blower to consume more energy than necessary.

SUMMARY

A method and system for controlling air flow supplied to a vehicle fuel cell are provided to improve the efficiency and mileage of a fuel cell system and maintain stack performance of the vehicle fuel cell even in high-current and low-current ranges.

In an aspect of the present invention, a method of controlling air flow of an air blower, supplied to a fuel cell, through an air flow control system includes: determining whether a first current required in response to a first air flow of the air blower is greater than a predetermined second current; calculating a first target air flow to be supplied to the fuel cell, when the first current is less than the predetermined second current; determining whether the first target air flow is greater than a second air flow measurable through a flow sensor; and setting the first target air flow to an extremely low air flow and controlling the extremely low air flow through a third current and a first revolutions per minute (RPM) matched to the extremely low air flow, when the first target air flow is less than the second air flow.

The method may further includes: calculating a second target air flow greater than the first target air flow, when the first current is greater than the predetermined second current; and controlling the second target air flow through a fourth current and a second RPM required in response to the second target air flow.

The method may further include determining whether a first battery state of charge (SOC) generated from a battery is less than a predetermined second battery SOC when the first target air flow is greater than the second air flow.

The method may further include: maintaining the second air flow as a fixed target air flow when the first battery SOC is less than the second battery SOC; and controlling the fixed target air flow through a fifth current and a third RPM required in response to the fixed target air flow.

The method may further include: calculating a third target air flow less than the second target air flow when the first battery SOC is greater than the second battery SOC; and controlling the third target air flow through a sixth current and a fourth RPM required in response to the calculated third target air flow.

In an aspect of the present invention, an air flow control system includes: a flow sensor for measuring air flow of an air blower, supplied to a fuel sensor; an RPM sensor for measuring RPM of a motor; and a control unit for calculating a current required according to control of the measured air flow and controlling the air flow through RPM matched to the calculated current, wherein the control unit comprises: a first determination module for determining whether a first current required in response to a first air flow of the air blower is greater than a predetermined second current; a first calculation module for calculating a first target air flow to be supplied to the fuel cell when the first current is less than the predetermined second current; a second determination module for determining whether the first target air flow is greater than a second air flow measurable through the flow sensor; and a first control module for setting the first target air flow to an extremely low air flow and controlling the extremely low air flow through a third current and a first RPM required in response to the extremely low air flow, when the first target air flow is less than the second air flow.

The control unit may further include: a second calculation module for calculating a second target air flow greater than the first target air flow, when the first current is greater than the predetermined second current; and a second control module for controlling the second target air flow through a fourth current and a second RPM required in response to the second target air flow.

The control unit may further include a third determination module for determining whether a first battery SOC generated from a battery is less than a predetermined second battery SOC when the first target air flow is greater than the second air flow.

The control unit may further include: a third control module for maintaining the second air flow as a fixed target air flow when the first battery SOC is less than the second battery SOC; and a fourth control module for controlling the fixed target air flow through a fifth current and a third RPM required in response to the fixed target air flow.

The control unit may further include: a third calculation module for calculating a third target air flow less than the second target air flow when the first battery SOC is greater than the second battery SOC; and a fifth control module for controlling the third target air flow through a sixth current and a fourth RPM required in response to the calculated third target air flow.

In another aspect of the present invention, a method of controlling air flows of an air compressor and an air pressure control valve, supplied to a fuel cell, through an air flow control system includes: determining whether a first current required in response to a first air flow of the air compressor is greater than a predetermined second current and less than a predetermined third current; determining whether a first battery SOC generated from a battery is less than a predetermined second battery SOC when the first current is less than the predetermined second current and third current (the second current being less than the third current); maintaining a fixed target air flow less than the first air flow when the first battery SOC is less than the predetermined second battery SOC; and controlling the fixed target air flow through a third RPM matched to the first current less than the second current and calibration of an open degree of the air pressure control valve.

The method may further include, prior to the determining of whether the first current is less than the predetermined third current: determining whether the first current is greater than the predetermined third current; calculating a first target air flow of the air compressor, supplied to the fuel cell, when the first current is greater than the predetermined third current; and controlling the first target air flow of the air compressor through a first RPM matched to the first current.

The method may further include: calculating a second target air flow of the air compressor when the first current is greater than the predetermined second current and less than the predetermined third current, the second target air flow being greater than the fixed target air flow and less than the first target air flow; and controlling the second target air flow through calibration of the open degree of the air pressure control valve under limitations on a second RPM required in response to the second target air flow.

The method may further include: calculating a third target air flow of the air compressor when the first battery SOC is greater than the predetermined second battery SOC, the third target air flow being identical to the fixed target air flow; determining whether the third target air flow is less than a second air flow measurable through a flow sensor; and setting the third target air flow to an extremely low air flow and controlling the extremely low air flow through calibration of an open degree of the air pressure control valve with respect to a fourth current required in response to the extremely low air flow, when the third target air flow is less than the second air flow.

In another aspect of the present invention, an air flow control system includes: a flow sensor for measuring air flows of an air compressor and an air pressure control valve, supplied to a fuel cell; an RPM sensor for measuring RPM of a motor; and a control unit for calculating a current required according to control of the measured air flows and controlling air flows of the air compressor and the air pressure control valve through RPM matched to the calculated current and calibration of an open degree of the air pressure control valve, wherein the control unit comprises: a first determination module for determining whether a first current required in response to a first air flow of the air compressor is greater than a predetermined second current and less than a predetermined third current; a second determination module for determining whether a first battery SOC generated from a battery is less than a predetermined second battery SOC when the first current is less than the predetermined second current and third current (the second current being less than the third current); a first control module for maintaining a fixed target air flow of the air compressor when the first battery SOC is less than the predetermined second battery SOC, the fixed target air flow being less than the first air flow; and a second control module for controlling the fixed target air flow through a third RPM matched to the first current less than the second current and calibration of an open degree of the air pressure control valve.

The control unit may further include: a third determination module for determining whether the first current is greater than the predetermined third current; a first calculation module for calculating a first target air flow of the air compressor, supplied to the fuel cell, when the first current is greater than the predetermined third current; and a third control module for controlling the first target air flow of the air compressor through a first RPM matched to the first current.

The control unit may further include: a second calculation module for calculating a second target air flow of the air compressor when the first current is greater than the predetermined second current and less than the predetermined third current, the second target air flow being greater than the fixed target air flow and less than the first target air flow; and a fourth control module for controlling the second target air flow through calibration of the open degree of the air pressure control valve under limitations on a second RPM required in response to the second target air flow.

The control unit may further include: a third calculation module for calculating a third target air flow of the air compressor when the first battery SOC is greater than the predetermined second battery SOC, the third target air flow being identical to the fixed target air flow; a fourth determination module for determining whether the third target air flow is less than a second air flow measurable through a flow sensor; and a fifth control module for setting the third target air flow to an extremely low air flow and controlling the extremely low air flow through calibration of an open degree of the air pressure control valve with respect to a fourth current required in response to the extremely low air flow, when the third target air flow is less than the second air flow.

Embodiments of the present invention can reduce energy consumption of the air blower by remarkably decreasing RPM with respect to air flow in a low-current range through RPM Map control, prevent dry-out of the fuel cell stack and maintain I-V performance of the stack, thereby promoting enhancement of system efficiency and fuel economy of a fuel cell vehicle.

In addition, the embodiments of the present invention can reduce energy consumption of the air compressor by remarkably decreasing RPM with respect to air flow in a low-current range through calibration of an open degree of the air pressure control valve, prevent dry-out of the fuel cell stack and maintain I-V performance of the stack, thereby promoting enhancement of system efficiency and fuel economy of a fuel cell vehicle.

Further, the embodiments of the present invention can reduce the frequency of exposure to a high voltage by maintaining a low fuel cell voltage with a remarkably low current in a low-current range of the air blower or the air compressor, thereby improving fuel cell durability.

The effects of the present invention are not limited to the above-described effects and other effects which are not described herein will become apparent to those skilled in the art from the following description.

DETAILED DESCRIPTION OF THE INVENTION

Figure 1:
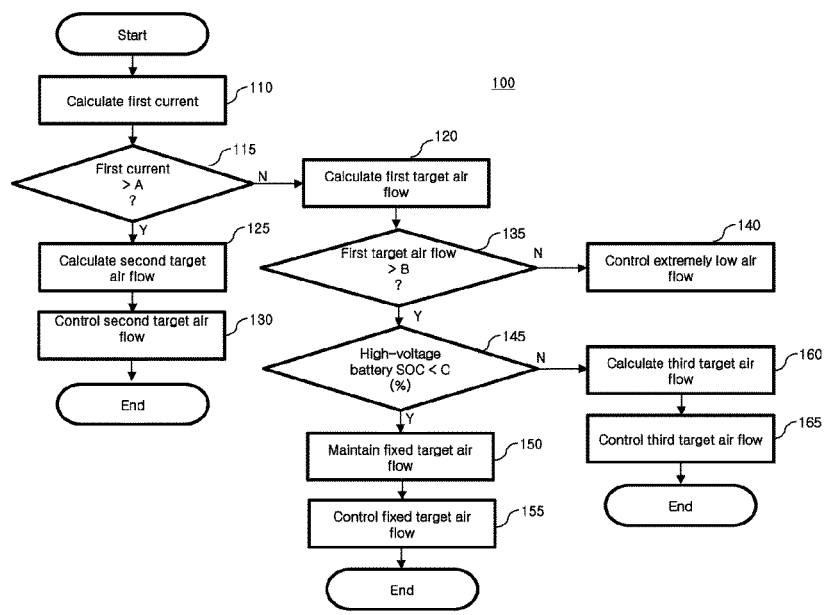
FIG. 1 is a flowchart illustrating an exemplary air flow control method according to an embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will now be described in more detail with reference to the attached drawings. The accompanying drawings illustrate exemplary embodiments of the present invention and provide a more detailed description of the present invention. However, the scope of the present invention should not be limited thereto. It should be understood that there is no intent to limit the invention to the particular forms disclosed herein. On the contrary, the invention is to cover all modifications, equivalents, and alternatives falling within the spirit and scope of the invention as defined by the claims.

An air flow control system as described herein typically is part of a fuel cell system (for pressurization), and the quantity of current necessary for air flow control indicates a required current level of a fuel cell according to a power distribution function, which reflects an acceleration amount of a driver.

A description will be given of a method and system for controlling air flow in detail.

<Exemplary air flow control method>

Figure 2:
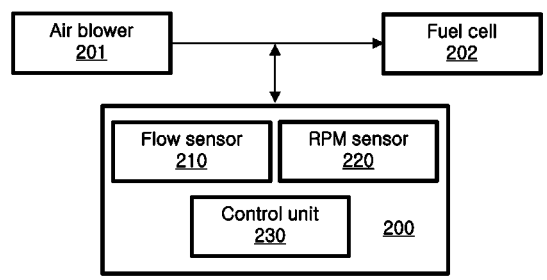
FIG. 2 is a block diagram of an air flow control system for implementing the air flow control method of FIG. 1.
Figure 3:
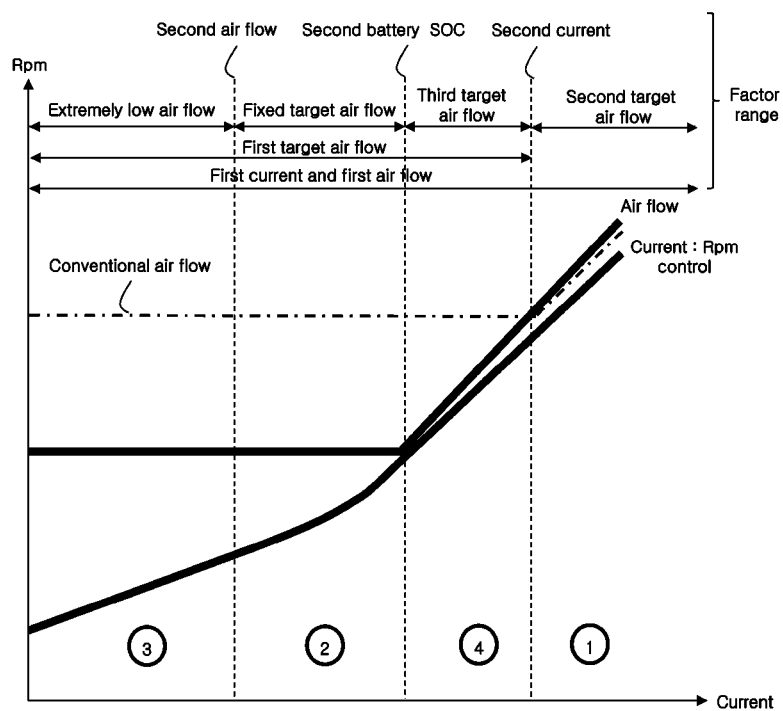
FIG. 3 is a graph showing factors used in the air flow control method of FIG. 1.

FIG. 1 is a flowchart illustrating an exemplary air flow control method according to an embodiment of the present invention, FIG. 2 is a block diagram of an air flow control system for implementing the air flow control method of FIG. 1, and FIG. 3 is a graph showing factors used in the air flow control method of FIG. 1. FIG. 3 will be used when the air flow control method shown in FIG. 1 is described.

An air flow control system 200 illustrated in FIG. 2 may include a flow sensor 210 for measuring air flow of an air blower 201 that is supplied to a fuel cell 202, an RPM sensor 220 for measuring revolutions per minute (RPM) of a motor, and a control unit 230 for adjusting the air flow generated from the air blower 201 using the air flow measured by the flow sensor 210 and controlling air flow on the basis of current and RPM required in response to the adjusted air flow.

The control unit 230 is a module that substantially controls air flow generated from the air blower 201 through the flow sensor 210 and the RPM sensor 220, and an air flow control method implemented through the control unit 230 will now be described.

Referring to FIGS. 1 and 3, an air flow control method 100 according to an embodiment of the present invention may include steps 110 to 165 to control the air flow of the air blower 201, which is supplied to the fuel cell 202 through the air flow control system 200, i.e., the control unit 230.

In step 110, the air flow control system 200 may calculate a first current required in response to a first air flow of the air blower 201, which is measured through the flow sensor 210.

As air flow increases, RPM and required current for controlling the air flow increase, in general. Accordingly, the required current can be calculated according to correlation between air flow and the RPM and required current. For example, when the first air flow is determined, the first current having a correlation with the air flow can be automatically calculated.

Therefore, the air flow control system 200 may determine whether the first current, which is calculated (required) in response to the first air flow of the air blower 201, is greater than a predetermined second current A in step 115.

For example, when the first current is less than the second current A, the air flow control system 200 can calculate a first target air flow to be supplied from the air blower 201 to the fuel cell 202 in step 120.

Here, the first target air flow may refer to air flow of the air blower 201, which corresponds to sections ② and ② shown in FIG. 3.

However, when the first current is greater than the second current A, the air flow control system 200 may calculate a second target air flow which is greater than the first target air flow and corresponds to section ① shown in FIG. 3, in step 125.

Accordingly, the air flow control system 200 can control the second target air flow through a fourth current and a second RPM required in response to the second target air flow in step 130.

For example, the fourth current and the second RPM can be easily calculated according to correlation between air flow and required current and RPM, as shown in FIG. 3, or acquired from the RPM sensor 220.

Here, control of the second target air flow through the fourth current and the second RPM may be referred to as RPM PI control.

RPM PI control may be a method using only PI control of PID (Proportional, Integral and Derivative) control which is a well-known automatic control scheme.

Step 135 is performed after step 120.

Specifically, the air flow control system 200 may determine whether the first target air flow is greater than a second air flow B that can be measured by the flow sensor 210 in step 135.

In the case of the flow sensor 210 for use in vehicles, a 5V output signal thereof is varied according to air flow change (output duty is varied according to air flow in the case of PWM type). A range of about 0 to 0.5 V and a range of about 4.5 to 5V are determined to be ranges in which air flow cannot be normally measured according to specifications of the flow sensor 210. In this case, an air flow value is not reliable and thus target air flow based RPM PI control cannot be performed.

Particularly, a flow sensor used for blower type air control cannot measure air flow in a range having air flow of below approximately 5 kg/h. The air flow of below approximately 5 kg/h may be a numerical value corresponding to operation at below approximately 2500 RPM.

Accordingly, the second air flow necessary in step 135 may refer to an air flow corresponding to the criterion of a minimum air flow that can be measured by the flow sensor 210.

While a precise flow sensor may be used instead of the flow sensor 210, the precise flow sensor preferably is not applied to the present embodiment because of high cost.

When the first target air flow is less than the second air flow that can be measured by the flow sensor 210, the air flow control system 200 can determine the first target air flow to be an extremely low air flow in step 140. The extremely low air flow corresponds to section ③ of FIG. 3.

When a very low air flow is supplied in a low-current range such as ③ of FIG. 3, partial flooding occurs inside of the fuel cell and water discharge property is deteriorated. However, it was experimentally proven that deterioration of cell voltage uniformity due to partial lack of air in a low-current range does not affect the durability and voltage performance of the stack.

There is no problem in operation with air supply based on current required in the low-current range. However, when air flow decreases to an extremely low level, it is necessary to control air flow to below the second air flow that can be measured by the flow sensor 210, as described above. In this case, air flow of the air blower can be controlled through 1:1 mapping of required current and required RPM instead of being controlled according to required current.

For example, the air flow control system 200 can control extremely low air flow of the air blower 201 by one-to-one mapping a third current and a first RPM matched to the extremely low flow in step 140.

Such extremely low flow control may be referred to as "RPM Map control". When the first target air flow is greater than B in step 135, step 145 can be performed.

That is, when the first target air flow is greater than the second air flow that can be measured by the flow sensor 210, the air flow control system 200 may determine whether a first battery SOC (State Of Charge) generated (acquired) from a battery (not shown) is less than a predetermined second battery SOC C in step 145.

The predetermined second battery SOC can serve as the criterion for discriminating section ② from section ④ in FIG. 3.

When the first battery SOC is less than the predetermined second battery SOC, the air flow control system 200 may maintain the second air flow that can be measured by the flow sensor 210 as a fixed target air flow in step 150.

For example, when the corresponding vehicle is driven with an extremely low current in a state that SOC of a high-voltage battery is low (e.g. section ③ and/or section ② in FIG. 3, IDLE), the battery needs to be recharged. Here, if air supply is reduced due to the aforementioned RPM Map control, the fuel cell may be charged with low efficiency and low battery charging current remarkably decreases the voltage of the fuel cell, resulting in insufficient battery charging.

Accordingly, when forced battery recharging is needed due to very low battery SOC, the air flow control system 200 maintains the second air flow corresponding to a minimum air flow that can be measured by the flow sensor 210 as the fixed target air flow, avoiding RPM Map control corresponding to section ③ of FIG. 3, in step 150.

In step 155, the air flow control system 200 may control the fixed target air flow through a fifth current and a third RPM which are required in response to the fixed target air flow maintained in step 150.

Fixed target air flow control corresponds to control for realizing section ② of FIG. 3.

However, when the first battery SOC is greater than the second battery SOC in step 145, the air flow control system 200 can calculate a third target air flow greater than the first target air flow and less than the second target air flow in step 160.

In step 165, the air flow control system 200 may control the third target air flow through a sixth current and a fourth RPM which are required in response to the calculated third target air flow.

For example, when battery SOC is remarkably reduced due to discharge mode operation of the high-voltage battery, the air flow control system controls the third target air flow less than the second target air flow for forced battery recharging, instead of controlling the air flow to the extremely low air flow corresponding to section ③ and low air flow corresponding to section ② of FIG. 3. This control scheme is the aforementioned RPM PI control and corresponds to control for realizing section ④ of FIG. 3.

According to the present embodiment, while air flow in a low-current range decreases, deteriorating performance in a low-performance region, for example, low-current range (② of FIG. 3) and extremely low-current range (③ of FIG. 3), stack performance is enhanced in middle or higher current ranges corresponding to 40A or higher (sections ④ and ① of FIG. 3).

Therefore, hydrogen usage can be reduced since the same power can be obtained even with relatively low current owing to improved performance in middle or higher current ranges.

For example, in the UDDS (Urban Dynamometer Driving Schedule) mode, hydrogen usage (energy) can be reduced about 1.7%. In case of repeated driving in the UDDS mode, the conventional scheme aggravates dry-out and thus average current (hydrogen usage) and energy consumption differences between the present invention and the conventional scheme increase.

<Exemplary air flow control system>

Figure 4:
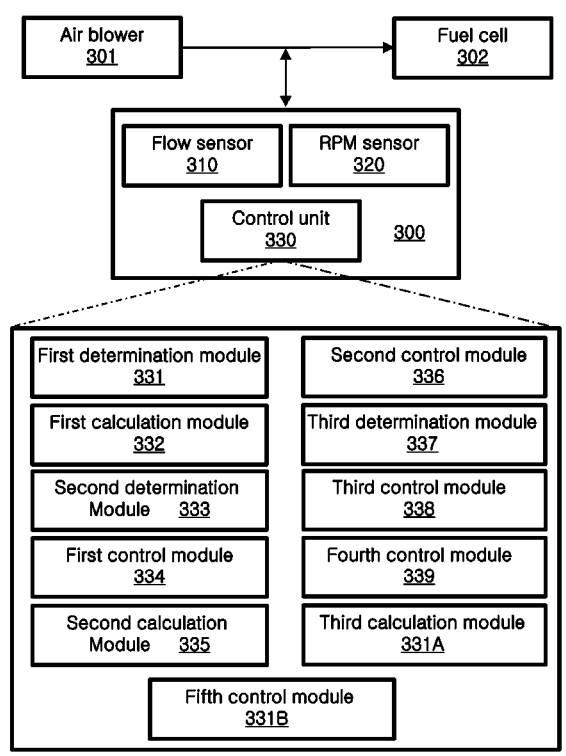
FIG. 4 is a block diagram of an exemplary air flow control system according to another embodiment of the present invention.

FIG. 4 is a block diagram of an exemplary air flow control system according to an embodiment of the present invention. FIG. 3 will be used when the air flow control system shown in FIG. 4 is described.

Referring to FIG. 4, an air flow control system 300 according to an embodiment of the present invention includes a flow sensor 310 for measuring air flow of an air blower 301, supplied to a fuel cell 302, an RPM sensor 320 for measuring RPM of a motor, and a control unit 330 for calculating the quantity of current required according to control of the measured air flow and controlling air flow through RPM matched to the calculated current.

The control unit 330 may include: a first determination module 331 for determining whether a first current required in response to a first air flow of the air blower 301 in order to implement RPM Map control corresponding to section ③ of FIG. 3 is greater than a predetermined second current; a first calculation module 332 for calculating a first target air flow to be supplied to the fuel cell 302 when the first current is less than the predetermined second current; a second determination module 333 for determining whether the first target air flow is greater than a second air flow that can be measured by the flow sensor 210; and a first control module 334 for setting the first target air flow to an extremely low air flow when the first target air flow is less than the second air flow and controlling the extremely low air flow through a third current and a first RPM required for the set extremely low air flow.

In addition, in order to implement RPM PI control corresponding to section ① of FIG. 3, the control unit 330 may further include: a second calculation module 335 for calculating a second target air flow greater than the first target air flow when the first current is greater than the second current; and a second control module 336 for controlling the second target air flow through a fourth current and a second RPM, which are required in response to the second target air flow.

Further, in order to implement fixed target air flow control corresponding to section ② of FIG. 3, the control unit 330 may further include: a third determination module 337 for determining whether a first battery SOC generated from the battery is less than a predetermined second battery SOC when the first target air flow is greater than the second air flow; a third control module 338 for maintaining the second air flow as a fixed target air flow when the first battery SOC is less than the second battery SOC; and a fourth control module 339 for controlling the fixed target air flow through a fifth current and a third RPM required in response to the maintained fixed target air flow.

Moreover, in order to implement RPM PI control corresponding to section ④ of FIG. 3, the control unit 330 may further include: a third calculation module 331A for calculating a third target air flow less than the second target air flow when the first battery SOC is greater than the second battery SOC; and a fifth control module 331B for controlling the third target air flow through a sixth current and a fourth RPM required in response to the third target air flow.

The aforementioned effects can be achieved through the control unit 330.

<Another exemplary air flow control method>

Figure 5A:
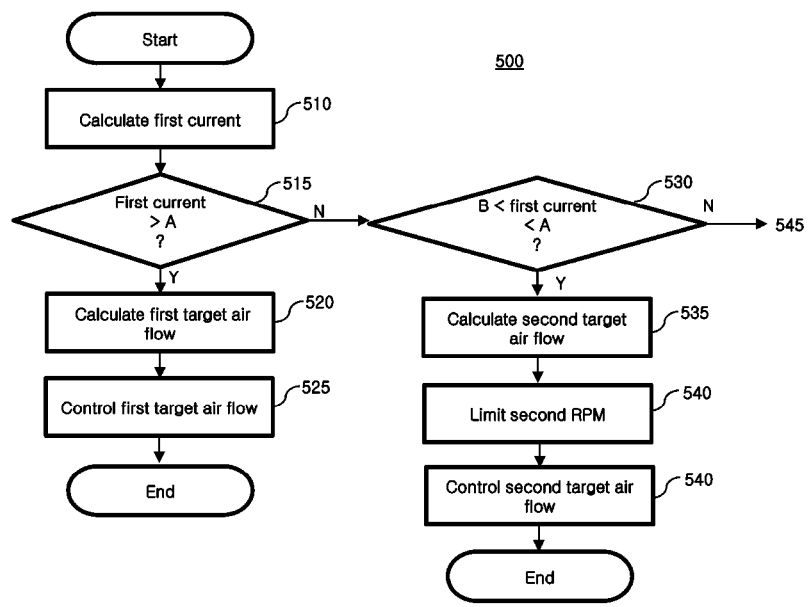
FIGS. 5(a) and 5(b) are flowcharts illustrating an exemplary air flow control method according to another embodiment of the present invention.
Figure 5B:
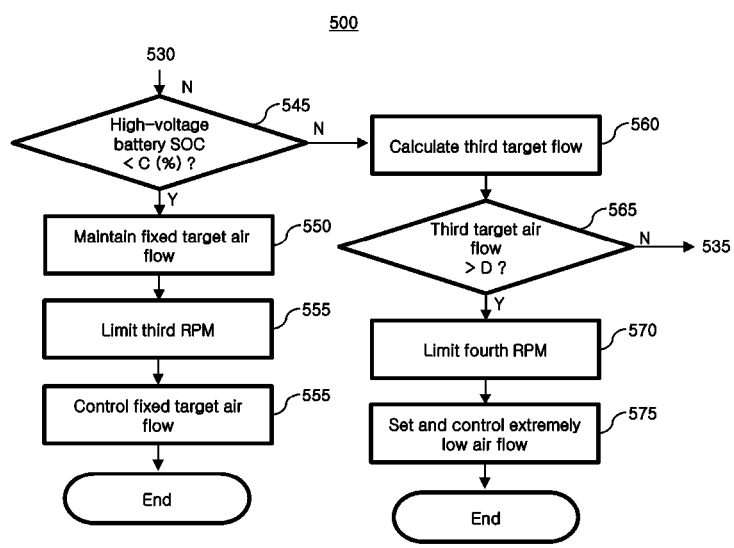
Figure 6:
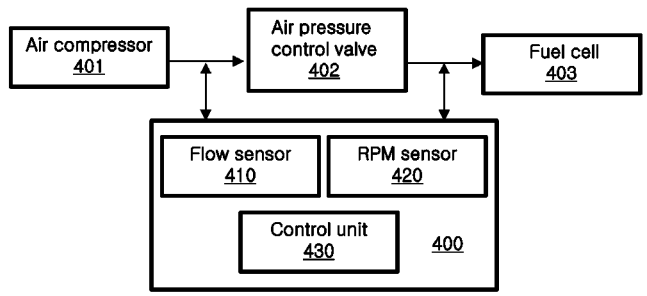
FIG. 6 is a block diagram of an air flow control system for implementing the air flow control method of FIGS. 5(a) and 5(b).
Figure 7:
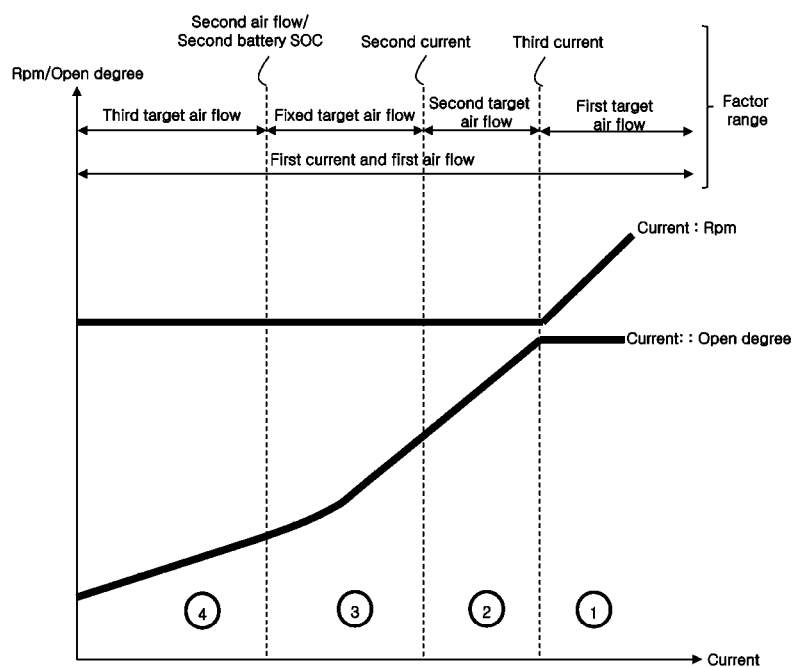
FIG. 7 is a graph showing factors used in the air flow control method of FIGS. 5(a) and 5(b).

FIGS. 5(a) and 5(b) are flowcharts illustrating an exemplary air flow control method according to another embodiment of the present invention, FIG. 6 is a block diagram of an air flow control system for implementing the air flow control method of FIGS. 5(a) and 5(b), and FIG. 7 is a graph showing factors used in the air flow control method of FIGS. 5(a) and 5(b). FIG. 7 will be used when the air flow control method illustrated in FIGS. 5(a) and 5(b) is described.

An air flow control system 400 illustrated in FIG. 6 may include a flow sensor 410 for measuring air flow generated from an air compressor 401 and air flow generated from an air pressure control valve 402, which are supplied to a fuel cell 403, an RPM sensor 420 for measuring RPM of a motor, and a control unit 430 for adjusting air flows of the air compressor 401 and the air pressure control valve 402 using the air flows measured by the flow sensor 410, calculating the quantity of current required in response to the adjusted air flows and controlling air flows of the air compressor 401 and the air pressure control valve 402 through an RPM matched to the calculated current and calibration of an open degree of the air pressure control valve 402.

The control unit 430 is a module that substantially controls air flows generated from the air compressor 410 and the air pressure control valve 402 through the flow sensor 410 and the RPM sensor 420.

Operating RPM is restricted in the case of the air compressor 401, for example, an airfoil compressor, applied to a fuel supply system for pressurized operation, distinguished from the air blower type described in FIGS. 1 to 4.

The air compressor 401 is equipped with an airfoil bearing. The air foil bearing cannot operate at lower than a specific RPM due to characteristics thereof. Since the airfoil bearing lifts the shaft by converting air flow into pressure and executes a lubricating function, the airfoil bearing cannot operate at lower than a specific RPM due to insufficient force of floating the bearing. When the bearing is driven in this case, the bearing may be mechanically damaged.

Accordingly, the air compressor 401 needs to operate at a specific RPM or higher to supply air flow to the fuel cell 403, and thus it is necessary to generate a base air flow.

The airfoil bearing type compressor applied to the fuel cell system has to abandon low air flow operation in order to cover all operating regions. Accordingly, low air flow control that the present embodiment intends to achieve may be impossible using only the air compressor.

However, the pressurized operation system includes the aforementioned air pressure control valve 402 provided to the stack exit for air operating pressure control. This can be used for air flow control of the present embodiment.

As the open degree of the air pressure control valve decreases with RPM maintained, flow resistance increases so as to decrease air flow and increase pressure. However, pressure change due to variation in the open degree of the air pressure control valve 402 is insignificant but air flow change is relatively large in a low air flow region, reducing power consumption of the air compressor 401.

Accordingly, the present embodiment can perform low air flow control by reducing RPM through calibration of the open degree of the air pressure control valve 402.

Further, when it is necessary to control air flow to be lower than air flow in operation with RPM limit, like the air flow control method described in FIGS. 1 to 4, the present embodiment can perform low air flow control through calibration of the open degree of the air pressure control valve 402. Even when a low air flow that does not reach the normal measurement range of the flow sensor 410 needs to be supplied, the present embodiment can control air flow necessary for extremely low current operation through one-to-one mapping between the open degree of the air pressure control valve and air flow, which is experimentally determined, differently from the method using the air blower type described in FIGS. 1 to 4.

Such features are implemented by the air flow control system 400, for example, the control unit 430 of the air flow control system 400. A description will be provided of an air flow control method implemented by the air flow control system 400.

Referring to FIGS. 5(a)-5(b) and 7, an air flow control method 500 according to an embodiment of the present invention may include steps 510 to 575 to control air flows of the air compressor 401 and the air pressure control valve 402, which are supplied to the fuel cell through the control unit 430.

In step 510, the air flow control system 400 may calculate a first current required in response to a first air flow of the air compressor 401, measured through the flow sensor 410.

As air flow increases, RPM and current for controlling the air flow increase. Accordingly, the current can be calculated through a correlation between air flow and RPM and current. For example, when the first air flow is determined, the first current having a correlation therewith can be automatically calculated.

Accordingly, the air flow control system 400 can determine whether the first current calculated (required) in response to the first air flow of the air compressor 401 is greater than a predetermined third current A in step 515.

The predetermined third current may refer to a current having an arbitrary magnitude corresponding to section ① of FIG. 7.

For example, the air flow control system 400 can calculate a first target air flow of the air compressor 401, which will be supplied to the fuel cell 403, when the first current is greater than the predetermined third current in step 520.

The calculated first target air flow may refer to an air flow having an arbitrary magnitude corresponding to section ① of FIG. 7.

The air flow control system 400 may control the first target air flow of the air compressor 401, calculated through a first RPM matched to the first current, in step 525.

The first current and the first RPM can be easily calculated through a correlation between air flow and current and RPM, as shown in section ① of FIG. 7, or confirmed through the RPM sensor 420.

Here, the first target air flow control through the first current and the first RPM may be referred to as RPM PI control.

RPM PI control may be a method using only PI control of PID (Proportional, Integral, Derivative) control which is a well-known automatic control scheme.

When the first current is less than the predetermined third current, the air flow control system 400 performs the following steps.

The air flow control system 400 may determine whether the first current calculated (required) in response to the first air flow of the air compressor 401 is greater than a predetermined second current B and less than the predetermined third current A in step 530.

The predetermined second current serves as a criterion for discriminating section ② from section ③ of FIG. 7.

For example, the air flow control system 400 can calculate a second target air flow of the air compressor 401, which is less than the aforementioned first target air flow, when the first current is greater than the predetermined second current and less than the predetermined third current in step 535.

The second target air flow may refer to an air flow having an arbitrary magnitude corresponding to section ② of FIG. 7.

In step 540, the air flow control system 400 may restrict a second RPM measured through the RPM sensor 420 by calibrating the open degree of the air pressure control valve 402 in response to the calculated second target air flow in order to prevent the airfoil bearing from being mechanically damaged.

Accordingly, the air flow control system 400 can control the second target air flow through calibration of the open degree of the air pressure control valve 402 within the range of restricting the second RPM required in response to the calculated second target air flow, in step 540.

The second target air flow control may be referred to as "air pressure control valve PI control".

The air pressure control value PI control may be a method using only PI control of PID (Proportional, Integral, Derivative) control which is a well-known automatic control scheme.

When the first current is less than the predetermined second current and the third current, the air flow control system 400 may determine whether a first battery SOC of the battery is less than a predetermined second battery SOC C in step 545.

The predetermined second battery SOC may serve as a criterion for discriminating section ③ from section ④ of FIG. 7.

When the first battery SOC is less than the predetermined second battery OSC C, the air flow control system 400 may set and maintain a fixed target air flow of the air compressor, which is less than the first air flow and/or the second target air flow, through calibration of the open degree of the air pressure control valve 402 in step 550.

In the case of operation in extremely low current ranges (e.g. section ③ and/or section ④ of FIG. 7, IDLE), an operating method depends on high-voltage battery SOC. When battery SOC decreases, forced charging is required to maintain the battery SOC and thus the open degree of the air pressure control valve 402 is not reduced any more for sufficient battery charging such that the fuel cell stack can normally supply battery charging power. When the battery SOC is significantly low and thus forced battery charging is needed, the aforementioned fixed target air flow less than the second target air flow is set and maintained.

The fixed target air flow is less than the second target air flow corresponding to section ② of FIG. 7 and may refer to section ③ of FIG. 7 corresponding to an extremely low air flow range.

In step 555, the air flow control system 400 can restrict a third RPM measured through the RPM sensor 420 and matched to the first current lower than the second current, through calibration of the open degree of the air pressure control valve 402. This may prevent the airfoil bearing from being mechanically damaged.

Accordingly, the air flow control system 400 can control the fixed target air flow less than the second target air flow through calibration of the open degree of the air pressure control valve 402 within the range of restricting the third RPM in step 555.

Fixed target air flow control may be referred to as air pressure control valve PI control, like the aforementioned second target air flow control.

When the first battery SOC of the battery is not less than the predetermined second battery SOC C in step 545, the following steps can be performed.

In step 560, the air flow control system 400 may calculate a third target air flow of the air compressor 401, which is identical to the fixed target air flow, when the first battery SOC is greater than the second battery SOC C.

In step 565, the air flow control system 400 may determine whether the calculated third target air flow is less than a second air flow D that can be measured through the flow sensor 410.

In the case of the flow sensor 410 for use in vehicles, a 5V output signal thereof is varied according to air flow change (output duty is varied according to air flow in the case of PWM type). A range of about 0 to 0.5 V and a range of about 4.5 to 5V are determined to be ranges in which air flow cannot be normally measured according to specifications of the flow sensor 410. In this case, an air flow value is not reliable and thus target air flow based RPM PI control cannot be performed.

Particularly, a flow sensor used for air control of an air compressor cannot measure air flow in a range having air flow of below approximately 5 kg/h. The air flow of below approximately 5 kg/h may be a numerical value corresponding to operation at below approximately 2500 RPM.

Accordingly, the second air flow D necessary in step 165 may refer to an air flow corresponding to the criterion of a minimum air flow that can be measured by the flow sensor 410.

While a precise flow sensor may be used instead of the flow sensor 410, the precise flow sensor preferably is not applied to the present embodiment because of high cost.

In step 570, the air flow control system 400 may restrict a fourth RPM measured through the RPM sensor 420 by calibrating the open degree of the air pressure control valve 402 in response to the calculated third target air flow when the third target air flow is less than the second air flow. This may prevent the airfoil bearing from being mechanically damaged.

Accordingly, the air flow control system 400 may set the calculated third target air flow to an extremely low air flow and control the extremely low air flow through calibration of the open degree of the air pressure control valve 402 within the range of restricting the fourth RPM required in response to the set extremely low air flow in step 575. The fourth RPM may be identical to the aforementioned third RPM.

Such extremely low air flow control may be referred to as "open degree Map control". The extremely low air flow control is very useful when forced battery charging is needed due to very low battery SOC.

The extremely low air flow may be identical to the fixed target air flow.

When the third target air flow is less than the second air flow in step 565, step 535 can be performed.

As described above, according to open degree Map control implemented in the present embodiment, low air flow supply can be controlled through calculation (changing) of the open degree of the air pressure control valve 402 when air flow needs to be controlled to be lower than air flow in operation with RPM limit. In addition, when an air flow less than the air flow that can be normally measured by the flow sensor 410 needs to be supplied, air flow necessary for extremely low current operation can be smoothly supplied to the fuel cell through one-to-one mapping between the air pressure control value open degree and air flow.

<Another exemplary air flow control system>

Figure 8:
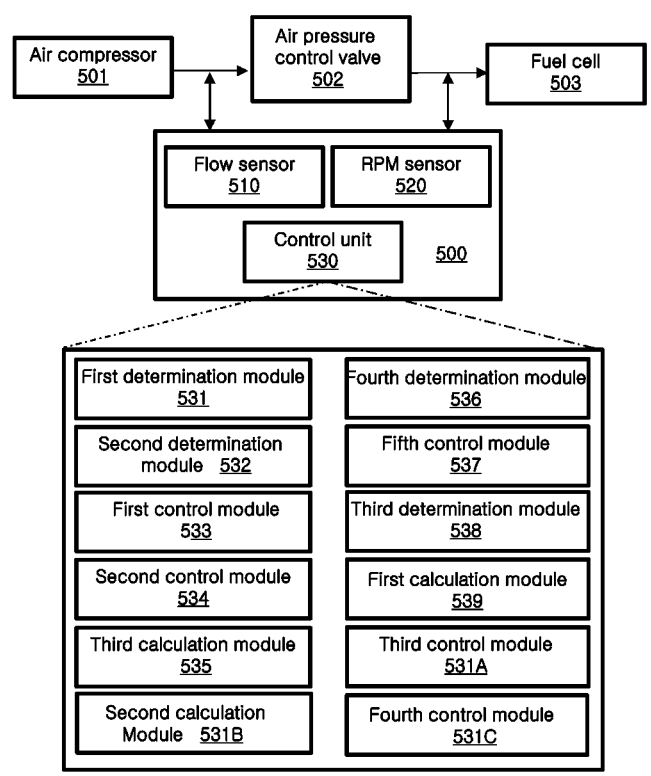
FIG. 8 is a block diagram of an air flow control system according to another embodiment of the present invention.

FIG. 8 is a block diagram of another example of an air flow control system according to an embodiment of the present invention. FIG. 7 will be referred to when the air flow control system of FIG. 8 is described.

Referring to FIG. 8, the air flow control system 500 according to an embodiment of the present invention may include a flow sensor 510 for measuring air flow generated from an air compressor 501 and air flow generated from an air pressure control valve 502, which are supplied to a fuel cell 503, an RPM sensor 520 for measuring RPM of a motor, and a control unit 530 for adjusting air flows of the air compressor 501 and the air pressure control valve 502 using the air flows measured by the flow sensor 510, calculating the quantity of current required in response to the adjusted air flows and controlling the air flows of the air compressor 501 and the air pressure control valve 502 through an RPM matched to the calculated quantity of current and calibration of the open degree of the air pressure control valve 502.

To realize section ③ of FIG. 7, the control unit 530 may include: a first determination module 531 for determining whether a first current required in response to a first air flow of the air compressor 501 is greater than a predetermined second current and less than a predetermined third current; a second determination unit 532 for determining whether a first battery SOC of the battery is less than a predetermined second battery SOC when the first current is less than the second current and the third current (the second current being less than the third current); a first control module 533 for maintaining a fixed target air flow of the air compressor, which is less than the first air flow, when the first SOC is less than the predetermined second battery SOC; and a second control module 534 for controlling the fixed target air flow through a third RPM matched to the first current less than the second current and calibration of the open degree of the air pressure control value.

To realize section ④ of FIG. 7, the control unit 530 may include: a third calculation module 535 for calculating a third target air flow of the air compressor, which corresponds to the fixed target air flow, when the first battery SOC is greater than the predetermined second battery SOC; a fourth determination module 536 for determining whether the third target air flow is less than a second air flow that can be measured by the flow sensor; and a fifth control module 537 for setting the third target air flow to an extremely low air flow and controlling the extremely low air flow through calibration of the open degree of the air pressure control valve with respect to a fourth current required in response to the extremely low air flow.

To realize section ① of FIG. 7, the control unit 530 may include: a third determination module 538 for determining whether the first current is greater than the predetermined third current; a first calculation module 539 for calculating a first target air flow of the air compressor, which will be supplied to the fuel cell, when the first current is greater than the predetermined third current; and a third control module 531A for controlling the first target air flow of the air compressor through a first RPM matched to the first current.

To realize section ② of FIG. 7, the control unit 530 may include: a second calculation module 531B for calculating a second target air flow of the air compressor, which is greater than the fixed target air flow and less than the first target air flow, when the first current is greater than the predetermined second current and less than the predetermined third current; and a fourth control module 531C for controlling the second target air flow through calibration of the open degree of the air pressure control value under limitations on a second RPM required in response to the second target air flow.

Section ① of FIG. 7 is an RPM PI control region according to target air flow and sections ② and ③ of FIG. 7 are PI control regions of the air pressure control valve (valve open degree control regions). In sections ①, ② and ③ of FIG. 7, only PI control of PID (Proportional, Integral, Derivative) control which is a well-known automatic control scheme, may be used.

Section ④ of FIG. 7 is an open degree Map control region, that is, a region in which control through mapping between required current and valve open degree is performed. Such open degree Map control region is a region in which measurement of the flow sensor 410 cannot be performed, and operation therein can be performed by one-to-one mapping required current and to valve open degree.

Particularly, in extremely low current regions corresponding to sections ③ and ④ of FIG. 7, an operating method may depend on high-voltage battery SOC. Since forced battery charging may be necessary to maintain battery SOC when the battery SOC decreases, the fixed target air flow and/or extremely low air flow are maintained, as described above, such that the fuel cell stack can normally supply battery charging power without reducing the valve open degree for sufficient battery charging.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling an air flow rate of an air blower, supplied to a fuel cell, through an air flow control system, the method being carried out by a program including program instructions executed by a control unit, configured to:

calculate a first current required in the fuel cell corresponding to the air flow rate of the air blower;
compare the first current with a predetermined second current;
calculate a first target air flow rate to be supplied to the fuel cell from the air blower, if the first current is less than the predetermined second current;
compare the first target air flow rate with a second air flow rate that is a minimum air flow rate measurable by a flow sensor;
control the first target air flow rate through one-to-one mapping of a third current required in the fuel cell corresponding to the first target air flow rate and a first revolutions per minute (RPM) of the air blower matched to the third current, if the first target air flow rate is less than the second air flow rate;
calculate a second target air flow rate, if the first current is greater than the predetermined second current; and
control the second target air flow rate through a proportional integral (PI) control of a fourth current and a second RPM required in response to the second target air flow rate.

2. The method according to claim 1, further configured to:
compare a first battery state of charge (SOC) generated from a battery with a predetermined second battery SOC, if the calculated first target air flow rate is greater than the second air flow rate.

3. The method according to claim 2, further configured to:
maintain the second air flow rate as a fixed target air flow rate, if the first battery SOC is less than the predetermined second battery SOC; and
control the fixed target air flow rate through a fifth current and a third RPM required in response to the fixed target air flow rate.

4. The method according to claim 2, further configured to:
calculated a third target air flow rate less than the second target air flow rate, if the first battery SOC is not less than the predetermined second battery SOC; and
control the third target air flow rate through a proportional integral (PI) control of a sixth current and a fourth RPM required in response to the third target air flow rate.

* * * * *